United States Patent [19]

Armor et al.

[11] 4,121,126
[45] Oct. 17, 1978

[54] GENERATOR TERMINAL BOX WITH MULTIPLE FLUX SHIELDING AND FORCED VENTILATION

[75] Inventors: Anthony F. Armor, Schenectady; Sterling C. Barton, Scotia; Madabushi V. Chari, Burnt Hills; Harold E. Collings, Schenectady; George W. Turnbull, Scotia, all of N.Y.

[73] Assignee: General Electric Company, Schenectady, N.Y.

[21] Appl. No.: 775,923

[22] Filed: Mar. 9, 1977

[51] Int. Cl.² .............................................. H02K 9/00
[52] U.S. Cl. ....................................... 310/59; 310/71; 310/85
[58] Field of Search ..................... 310/52, 53, 59, 54, 310/55, 58, 57, 64, 65, 71, 60, 256, 85, 89; 174/35 CE; 336/84 R

[56] References Cited

U.S. PATENT DOCUMENTS

| | | | |
|---|---|---|---|
| 2,683,227 | 7/1954 | Beckwith | 310/55 |
| 2,742,582 | 4/1956 | Bahn | 310/52 |
| 2,742,583 | 4/1956 | Beckwith | 310/57 |
| 2,828,428 | 3/1958 | Baudry | 310/64 |
| 3,808,489 | 4/1974 | Albright | 310/52 |
| 3,903,441 | 9/1975 | Towne | 310/71 |
| 4,029,978 | 6/1977 | Jäger | 310/64 |

FOREIGN PATENT DOCUMENTS 675,877  2/1930  France ................................ 174/35 CE

*Primary Examiner*—R. Skudy
*Attorney, Agent, or Firm*—John F. Ahern; James W. Mitchell

[57] ABSTRACT

A terminal box for a dynamoelectric machine utilizes a flux shield system wherein a plurality of flux shields are interposed between the wall of the terminal box and a high voltage bushing. Cooling fluid is passed through the flux shield system to maintain all parts at a safe, low temperature. In one embodiment of the invention, a first inner flux shield member of high electrical conductivity and low magnetic permeability is spaced from but surrounding the bushing. A second outer flux shield member of low electrical conductivity and high magnetic permeability is spaced between the first shield member and the terminal box wall. Passages and openings are provided to allow cooling fluid to circulate over the respective shield members and the wall of the terminal box without providing a path for transmission of flux from the area surrounding the bushing to the terminal box wall. The fluid flow path and the suction ducts for removing coolant from the terminal box are arranged to ensure maximum flow of cooling fluid over the most heated portions of the terminal box wall.

10 Claims, 10 Drawing Figures

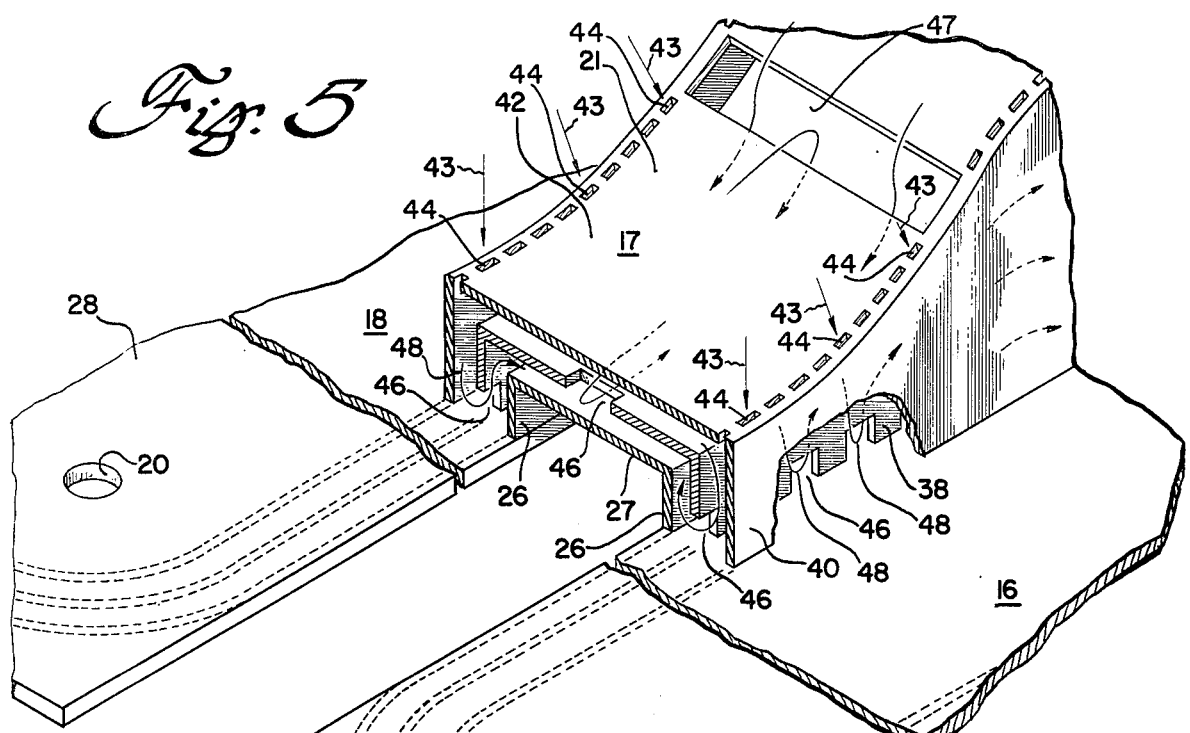
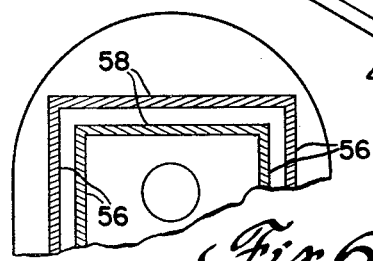
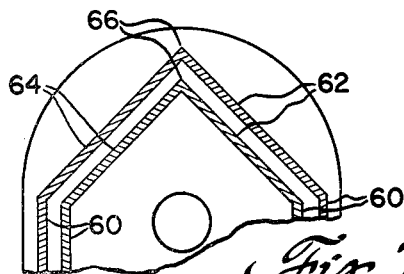
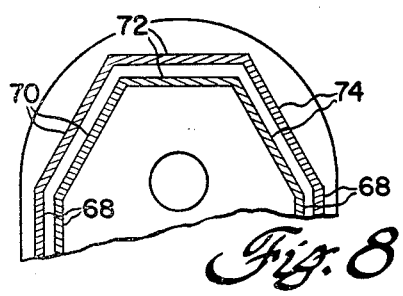
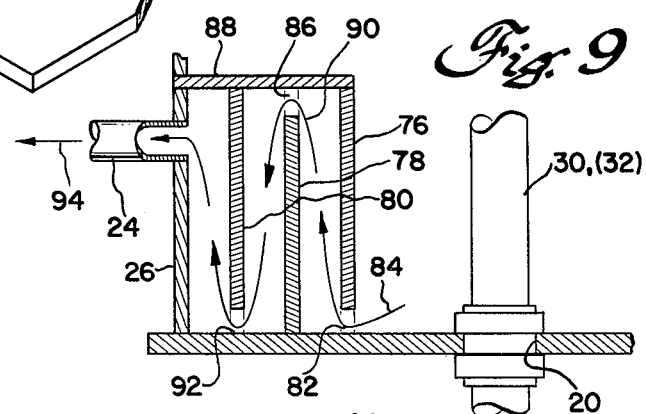
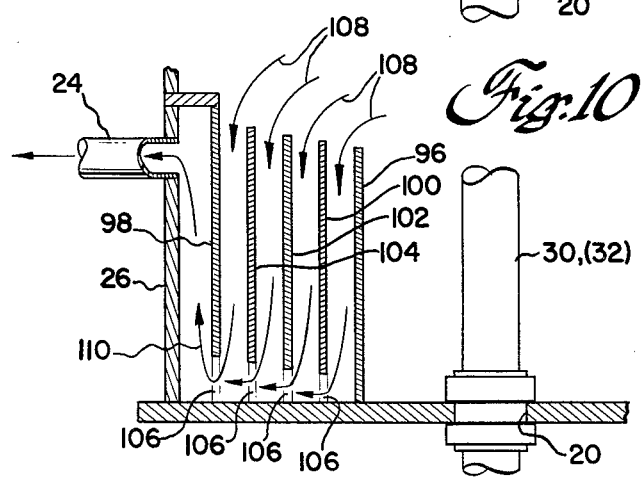

GENERATOR TERMINAL BOX WITH MULTIPLE FLUX SHIELDING AND FORCED VENTILATION

BACKGROUND OF THE INVENTION

1. Field of the Invention

This invention relates to dynamoelectric machines and more particularly to terminal boxes for high voltage bushings employed with such machines.

2. Description of the Prior Art

Stray magnetic flux from the phase leads and neutral leads carried through the terminal box of a dynamoelectric machine by the high voltage bushings may, in the absence of appropriate shielding, impinge upon the walls of the terminal box and cause circulating currents therein. This can result in substantial undesirable heating of the terminal box walls.

Flux shields have been employed in the prior art to reduce the amount of stray flux impinging on the wall of the terminal box and hence to reduce the heating of the terminal box. One such prior art flux shield is shown in U.S. Pat. No. 3,808,489 - Albright et al., which is assigned to the assignee of the present invention. The structure shown in the Albright et al. patent effects substantial shielding and significantly reduces the temperature which would otherwise be present in the wall of the terminal box. The Albright et al. structure does not, however, achieve optimal results in this respect, in part because necessary passages for flow of cooling fluid provide openings for direct transmission of flux from the bushings to the wall of the terminal box, in part because of the fact that only a single flux shield of a single material is used, and in part, because the coolant flow paths do not provide optimum cooling to the portions of the terminal box wall susceptible to the greatest heating. By the present invention, these shortcomings of the aforementioned prior art structure are overcome and a flux shielding arrangement is provided which precludes any direct transmission of the stray flux from the bushing area to the wall of the terminal box and which, by using multiple shields and by using different kinds of material for the multiple shields employed, achieves improved shielding. Additionally the coolant flow is direct at higher velocity over the regions of highest heating and improved cooling thereat is achieved.

Accordingly, it is an object of this invention to provide an improved terminal box structure for dynamoelectric machines which reduces the heating of the walls of the terminal box.

It is another object of this invention to provide an improved flux shielding arrangement for the terminal box of such machines.

It is still another object of the invention to provide maximum cooling fluid velocity in regions of maximum heating susceptibility.

SUMMARY OF THE INVENTION

Briefly stated, the invention, in one embodiment thereof, utilizes the interposition of multiple flux shields between the high voltage bushings and the walls of a multi-pod (polyphase) terminal box of a high voltage dynamoelectric machine. The flux shields are spaced from each other and from the wall of the terminal box to provide passages for flow of cooling fluid over the flux shields and the terminal box wall, both in the respective pods and in the regions which interconnect respective pods. The flux shield nearest the wall of the terminal box is made of a good magnetic material which has a relatively low electrical conductivity. A second flux shield is interposed between this flux shield and the bushing and is made of a non-magnetic material of relatively high electrical conductivity. The flux shields are constructed so that cooling fluid passes through openings at the top of the inner or non-magnetic shield, then between the respective flux shields, through openings at the bottom of the outer or magnetic shield and thence along the wall of the terminal box to a suction duct. The arrangement of the fluid-flow path and the location of the suction ducts are designed to ensure that all coolant passes over the end portions of the respective pods of the terminal box at which maximum heating tends to occur. This results in high velocity fluid flow at these regions and improved cooling. If desired, a greater number of flux shields may be employed, those nearest the bushing being of non-magnetic material, those nearest the wall being of magnetic material. In one form of the invention, the flux shields conform generally to the shape of the side walls of the terminal box pods being planar along the sides of the pods and curved at the ends, and extending over the connecting members intermediate adjacent pods. In other forms of the invention the end portions within the pods may be formed in alternative configurations.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 5 is a sectional-perspective schematic representation of the flux shielding and coolant flow in the region intermediate two pods in FIG. 2 and is taken along section line 5—5 of FIG. 2.

FIGS. 6, 7, 8 are partial views corresponding to FIG. 3 showing modified forms of the flux shields of this invention in the curved portion of the pods.

FIG. 9 illustrates another embodiment of this invention utilizing an additional flux shield.

FIG. 10 illustrates still another modified form of this invention incorporating additional flux shields.

DESCRIPTION OF A PREFERRED EMBODIMENT

Figure 1:
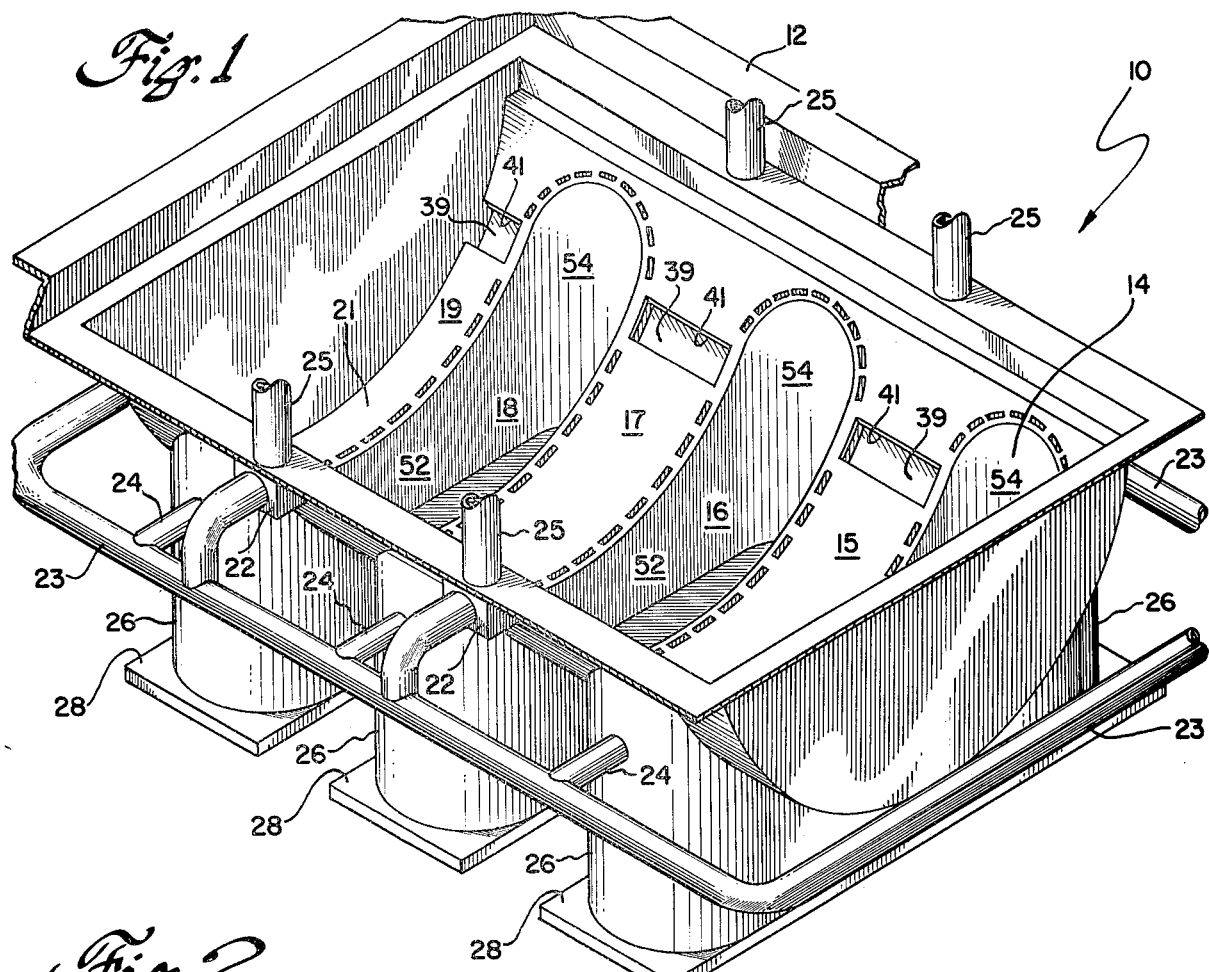
FIG. 1 is an isometric view in simplified form of a three-pod (three-phase) terminal box illustrating the configuration thereof.

FIG. 1, illustrates a terminal box 10 which includes a flanged upper edge 12 by means of which the terminal box may be bolted or otherwise secured to the bottom of a dynamoelectric machine with which it is employed. For a clearer understanding of the environment of the present invention, reference is made to U.S. Pat. No. 2,742,582—Bahn et al. which illustrates a typical high voltage fluid-cooled bushing for a large electric generator and which is incorporated herein by reference thereto. The terminal box illustrated in FIG. 1 is intended to be employed with a three-phase generator and includes three downwardly depending chambers or pods of terminal box portions 14, 16 and 18. Pods 14, 16, 18 are interconnected by bridging members 15 and 17, which together with end extension members 19 are a part of a cylindrical surface 21 of the inner terminal box wall. Within each of these pods there are two bushings through one of which the phase lead for that phase is carried and through the other of which a neutral lead is carried. These bushings are received in openings formed in the bottom of the terminal box, two of which are shown at 20. From pods 14, 16 and 18 conduits 24 extend outwardly, are connected to conduits 23 and eventually to return manifolds 22 and thence to suction ducts 25. The suction ducts 25 are adapted to be connected to the intake side of a fan employed for circulating cooling fluid through the generator and through the terminal box.

The terminal box in practice may include elements, including other conduits, ducts and manifolds, but these are not essential to an understanding of the invention, and have been omitted for clarity of illustration.

Figure 2:
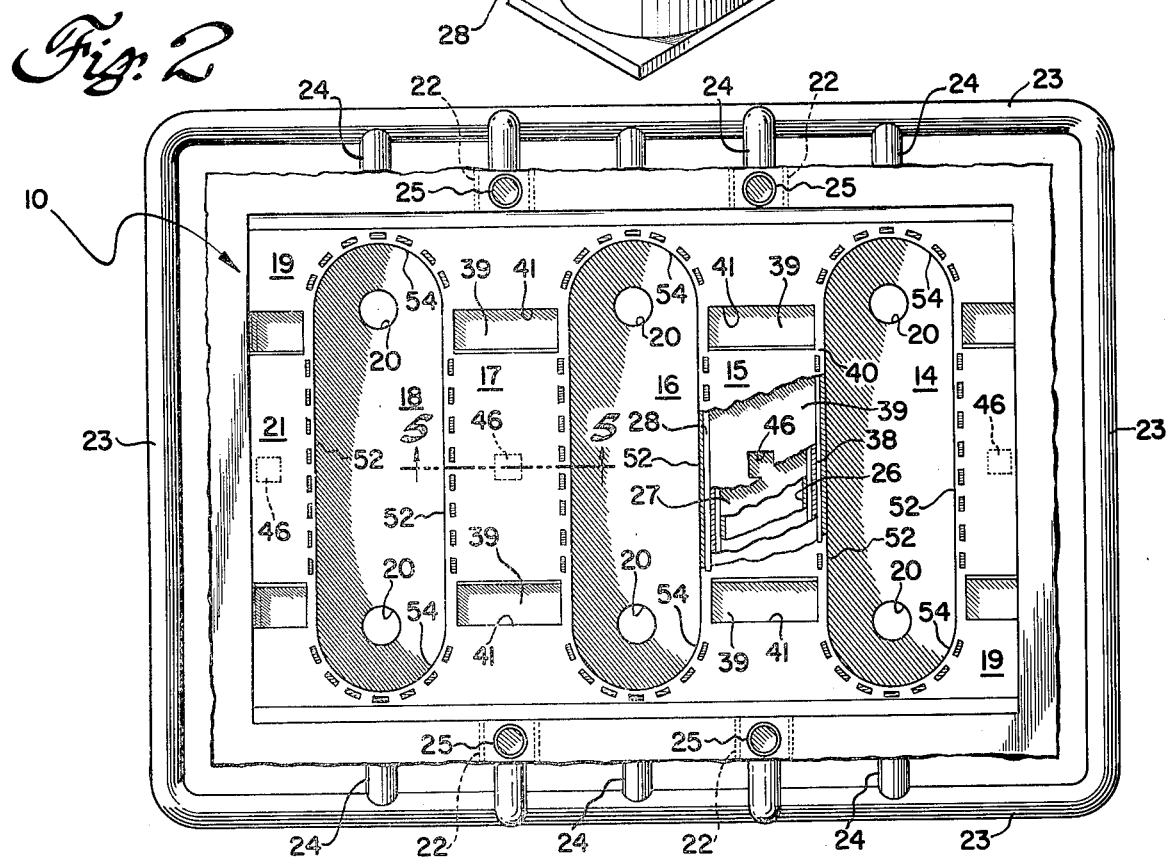
FIG. 2 is a partial plan view of the terminal box of FIG. 2 illustrating the flux shielding in two pods and one intermediate region thereof.
Figure 3:
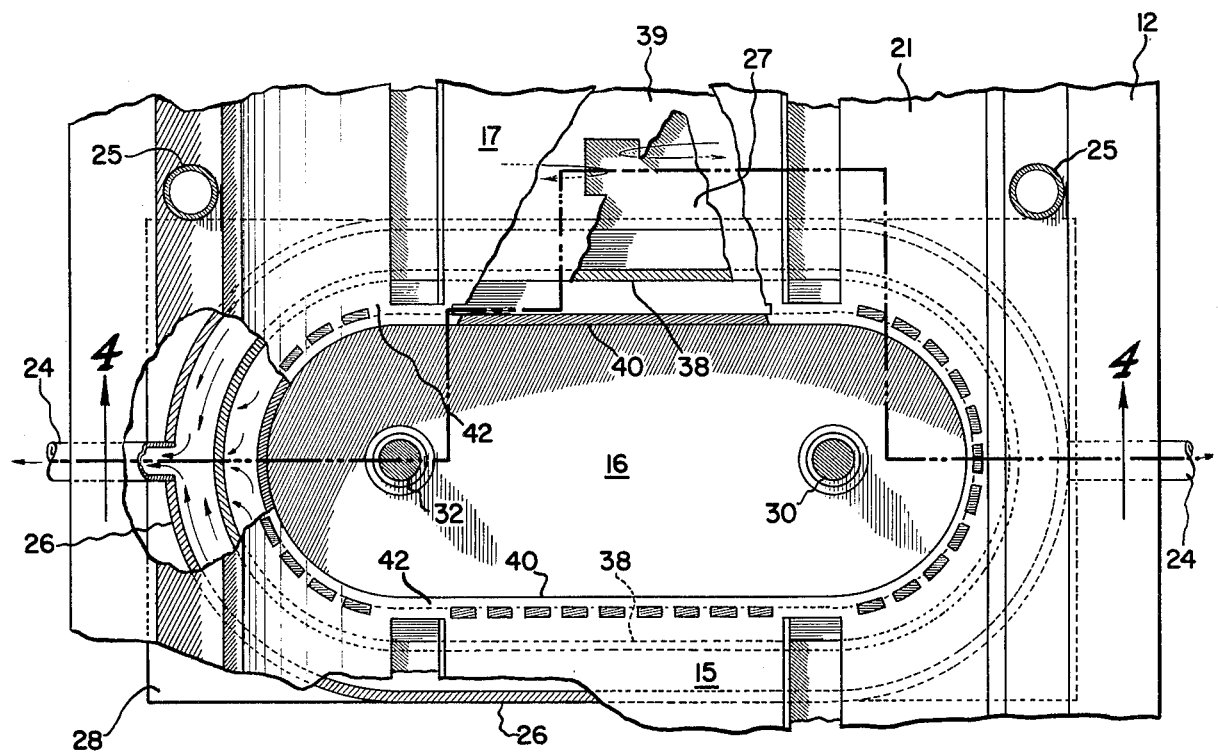
FIG. 3 is an enlarged plan view of one pod of the terminal box, illustrating the relationship of the flux shields in one embodiment of this invention.
Figure 4:
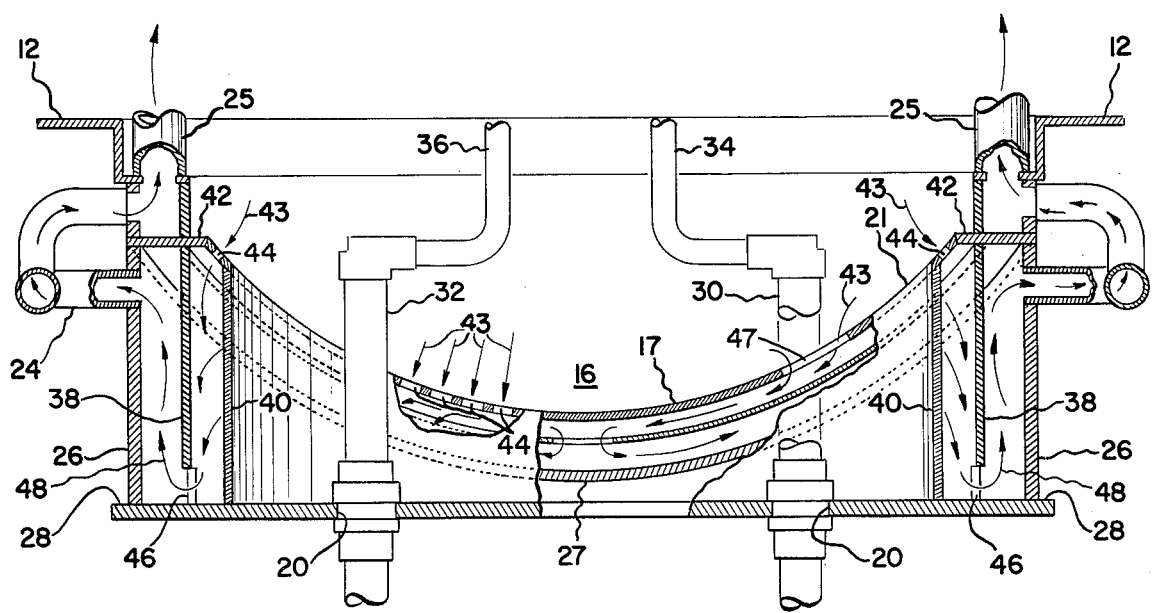
FIG. 4 is a vertical sectional view taken along the line 4—4 in FIG. 3.

FIGS. 2–5 illustrate details of the shielding arrangement of this invention. For the purpose of simplifying the description, only one flux shielding arrangement, as utilized with one phase pod of the three-phase generator, has been shown in FIGS. 3 and 4. In actual practice the structure is normally utilized with multi-phase, and particularly three-phase machine. It will be understood that the shielding arrangement illustrated in FIGS. 2–4 is applied in the same manner to the remaining portions of the terminal box utilized with the bushing of the other phases of the three-phase generator as well as the portions of the terminal box wall interconnecting or associated with the respective pods. It will be further understood that the shielding arrangement could be used, if desired, with a single-phase generator.

FIGS. 1–4 show a terminal box having a wall portion 26, corresponding to any one of the wall portions of pods 14, 16, 18 of FIG. 1, which extends from flange 12 at the top thereof to a base plate 28 at the bottom of the pod. The base plates 28 form a portion of the bottom of the terminal box. The conduits 24 from which cooling fluid is conducted through conduits 23 to the manifolds 22 and thence to suction ducts 25 and the intake side of a fan are shown.

Within each pod 14, 16, 18, and extending through the bottom thereof are two spaced bushings 30 and 32. The bushing 30 encloses the line conductor 34 for this phase and the bushing 32 encloses the neutral conductor 36. In the normal operation of a generator, and particularly a high-voltage, high-current generator, stray flux is developed from current flowing through the conductors 34 and 36 and, in the absence of a suitable shielding arrangement, this flux impinges on the wall portion 26 of the terminal box causing substantial heating thereof due to induced eddy currents therein.

In accordance with this invention, such deleterious effects of the stray flux are minimized and in addition, provision is made for more effectively cooling the wall portion by interposing between the wall portion and the bushings a plurality of flux shields. In the particular embodiment shown in FIGS. 2–4, two such flux shields are employed. A first outer shield 38 is positioned in spaced relationship to the wall portion 26 and not only shields the wall portion from flux but also provides a passage for flow of cooling fluid between the first flux shield and wall portion 26 for effectively cooling these elements, and particularly the wall portion 26. A second inner flux shield 40 is interposed between the first shield 38 and the bushings 30, 32. The flux shield 40 is spaced from the first flux shield 38 and provides a passage for flow of cooling fluid between the two flux shields.

In accordance with this invention, the two flux shields are not only positioned in the relationship illustrated and described, but they are made of materials having particular characteristics. Specifically, flux shield 38 is made of a magnetic material which also has a relatively low electrical conductivity. In a specific embodiment of this invention, the flux shield 38 is made of carbon steel and may have a thickness of approximately ¼ inch. The inner flux shield 40 is made of a non-magnetic material and one having a relatively high electrical conductivity. In a specific embodiment of this invention, this flux shield is made of aluminum and may have a thickness of approximately ½ inch. Alternatively, the inner flux shield 40 may be made of other non-magnetic, high electrical conductivity materials, such as copper. For best results, it is desirable to keep the shields as far as possible from the conductors which extend through the bushings consistent with providing sufficient space between the shields and between the outer shield and the wall portion to secure satisfactory flow of cooling fluid.

The reason for the order of the arrangement of the high and low permeability flux shields is to minimize the heating in the high permeability, low conductivity shield or shields. Since such heating is due to the flow of induced eddy currents and since the high permeability material has a high resistivity, the $I^2r$ losses are greater for a given current in the high permeability shield than in the low permeability shield. Thus the low permeability, high conductivity shield is located interior of the high permeability shield to dissipate the larger portion of the flux at a point remote from the terminal wall. This is also the reason for the increased thickness of the low permeability shield, since in increasing thickness the current density becomes lower and heat per unit volume is lower. The spacing between the respective shields is made sufficient to allow sufficient cooling fluid flow, while at the same time permitting location of the entire flux shield structure at a point as remote from the conductors as possible. In the example referred to above, an appropriate spacing between the respective flux shields and the flux shield and the terminal box wall would be within the range of ¼ to ½ inch, with an optimum of approximately ⅜ inch.

By employing multiple flux shields in the manner illustrated and described, the magnetic field due to the conductors extending through the bushings is attenuated successively in the plurality of flux shields, and the portion of the field reaching the wall portion 26 of the terminal box is of a very low value so that the outside of the terminal box is maintained at a temperature which is completely acceptable. Further, the attenuation of the field is gradual and therefore does not impose a heavy thermal burden on any one shield.

By specifically making the flux shield which is nearest to the bushings, that is, nearest to the conductors, of non-magnetic, high electrical conductivity material this shield absorbs a lesser amount of the losses and still shields the outer, or magnetic, shield.

The multiple flux shield arrangement of this invention also provides for more effective cooling not only of the shields themselves but of the wall portion of the terminal box. In the form of the invention shown in FIGS. 1-5, cooling fluid, which has been received from the cooling system of the generator through the open top of the terminal box, is directed through openings 44 at the top edge 42 of the inner shield 40, as indicated by the arrows 43 in FIGS. 4 and 5. The cooling fluid flows downwardly between the shields 38 and 40 and passes to the space between the shield 38 and the wall portion 26 through a plurality of openings, two of which are shown at 46 in FIG. 4. Thereafter, the cooling fluid flows both upwardly and laterally normal to the plane of the figure between the flux shield 38 and the wall portion 26, as indicated by the arrows 48, effectively cooling the wall portion 26, as well as the flux shield 38. The lateral circulation of the coolant is because the coolant from the entire flux shield exits from the terminal box through conduits 24 at the ends of the pod. Since all the coolant exits at this point the coolant velocity is greatest in the end regions and compensates for the tendency of the end region to heat at a greater rate, as is discussed above. The cooling fluid passes into the conduits 24 through conduits 23 and is eventually passed to manifolds 22 from which it returns to the generator. The manifolds 22 are connected through suction ducts 25 to the intake of a fan which is employed for circulating cooling fluid through the generator as well as to the terminal box and bushings.

Referring to FIGS. 2 and 5, it may be seen that the flux shields of the invention extend not only vertically into pods 14, 16, 18, but also extend over and shield the respective interconnecting and end extension portions 15, 17 and 19 of inner surface 27 of the terminal box wall. The flux shields follow substantially the entire inner configuration of the entire terminal box to ensure complete shielding thereof.

FIG. 2 illustrates in plan view the transverse portion 41 of inner flux shield 40 and the transverse portion 39 of outer flux shield 38. FIG. 5, which is a sectional-perspective view of this region taken along section line 5—5, in FIG. 2, illustrates how the bottom of terminal box wall 26 includes base plates 28 (generally of stainless steel which may be weakly magnetic) and interconnecting portions 27 (generally of carbon steel, a strong magnetic material). As may be seen from FIG. 5 the outer shield 38 creates a channel for coolant flow between itself and the terminal box wall. Similarly another channel is created between outer flux shield 38 and inner flux shield 40.

It may also be seen in FIGS. 4 and 5 that coolant flow enters between shields 38 and 40 through apertures 44 in shield 40 and passes through apertures 46. To facilitate flow between the respective passages in the interconnecting portion, further apertures 47 are located in the transverse interconnecting portion of inner shield 40, allowing for lateral flow of coolant between the shield 38 and 40 and between the terminal box wall and shield 38.

Referring again to FIG. 4, it can be seen by reference to FIG. 3 that the wall portion 26 is shielded from the bushings 30, 32 not only by the flux shield 38 but also by the inner, spaced flux shield 40. The flux shield 40 extends downwardly to the bottom of the terminal box, abutting the base plate 28 which forms its bottom. Thus, it can be seen that the openings 46 which are provided for flow of cooling fluid to the wall portion 26 are shielded from the bushings by the inner flux shield 40 so that the openings 46 do not provide a direct path for the transmission of flux from the bushing area directly to the wall portion 26. The multiple flux shield structure of this invention provides a staggered relationship of the openings in the separate flux shields for flow of cooling fluid, openings being provided at the top of flux shield 40 and at the bottom of flux shield 38. This staggered arrangement of the openings prevents any direct path for transmission of flux from the area of the bushings to the wall portion 26 and minimizes the possibility of development of hot spots in the wall portion 26 in the region of the openings 46.

Moreover, the flux shielding arrangement of this invention provides an additional advantage in connection with oil which accumulates in small amounts at the bottom of the terminal box. This accumulation of oil, even in small amounts, can obstruct the flow of cooling fluid. By the arrangement shown in FIGS. 2-4, the openings for entry of cooling fluid to the passage between the shields 38 and 40 are disposed at a substantial distance above the bottom of the terminal box and hence any oil accumulating at the bottom of the terminal box can have no effect in blocking ingress of cooling fluid along the paths indicated by the arrows 43. The openings 46 which provide for flow of cooling fluid from the passage between the flux shields 38 and 40 to the passage between the flux shield 38 and the wall portion 26 are located at the bottom of the flux shield 38 in order to ensure flow of cooling fluid over the entire lower surface of the wall 26. However, any oil accumulating in the bushing area in the bottom of the terminal box is blocked from these openings 46 by the interposed flux shield 40 and hence can have no effect on the flow of cooling fluid through the openings 46. Hence, any oil which may accumulate from time to time in the bottom of the terminal box can have no adverse effect on the flow of cooling fluid until several inches of oil have accumulated. Such accumulation takes a long period of time and will normally be found by routine inspections and will be removed.

In the embodiment shown in FIGS. 2-4, the flux shields 38 and 40 are shaped to conform generally to the shape of the wall 26 of the terminal box including surface 19. Thus, in the pods, the flux shields each include flat side portions 52 and curved end portions 54 which connect the side portions 52 to form a complete, somewhat oval cross-sectional shape in pods 14, 16, 18. In the preferred form shown, the flux shields are continuous, blocking the transmission of flux directly from the bushing area to the wall portion of the terminal box throughout the area of the wall portion in the pods. If desired, portions of the inner flux shield 40 could be omitted, for example, the side portions 52, but this would result, of course, in reducing the shielding of the wall portion of the terminal box in any area where such portions of the inner flux shield were omitted.

The form of flux shield having the arcuate end portions in pods 14, 16, 18, shown in FIGS. 2-4 is advantageous because the shields are shaped generally concentric to the conductors and the cooling paths for flow of cooling fluid are well defined, providing for manufacturing advantages. It is not, however, the ideal configuration from an electromagnetic point of view. If desired, therefore, alternative forms of flux shield structure shown in FIGS. 6, 7 and 8 may be employed to optimize the electromagnetic characteristics of the flux shields in the pods.

In the embodiment shown in FIG. 6 the flux shields of the invention include flat side portions 56, corresponding generally to the side portions 52 of the form illustrated in FIG. 3. These side portions, in lieu of being connected by curved portions 54 as in the embodiment shown in FIG. 3, are connected by flat end portions substantially perpendicular to the side portions 52, one such end portion being shown at 58 in FIG. 6. It will be understood that the other end of the pod portion of the flux shield, not shown in this figure, has the same shape. This embodiment is the ideal configuration from an electromagnetic shielding point of view. Electromagnetic shielding is accomplished by a dissipation of the flux field by the induction of eddy currents in the shield, which currents circulate normal to the direction of the flux field. Thus in the embodiment of FIG. 6 eddy currents flow along the surfaces of members 58 normal to the flux field, and the flux is dissipated. In the embodiment of FIGS. 2 and 3, on the other hand a multiplicity of eddy-current loops are established within the thickness of the curved end walls and the flux field, although weakened some, is partially re-established outside the flux shield. It is for this reason that the end portions of the terminal box pods are most susceptible to heating when a curved-end flux shield arrangement is used and why improved fluid cooling in this area is important.

The structural shapes of flux shield shown in FIGS. 7 and 8 represent compromises between the mechanically ideal shape of flux shield utilized in the embodiment shown in FIG. 3 and the electromagnetically ideal rectangular-shaped flux shields shown in FIG. 6.

Thus, referring to FIG. 7, the pod portions of the flux shields in this embodiment include flat or planar side portions 60 connected by end portions, each of which comprises two flat sections 62 and 64. Each flat section is connected at one end to a corresponding one of the side portions 60 and the flat sections are joined at an apex 66.

In the embodiment shown in FIG. 8, the pod portion of each flux shield includes flat side portions 68 connected by end portions formed in three interconnected flat sections 70, 72 and 74. Each of the sections 70 and 74 is connected at the opposite end to the flat section 72. The flat sections 70 and 74 form an angle of approximately 120° with the side portions 68 and also form an angle of approximately 120° at the point of connection with the ends of the flat section 72. Or, stated another way, adjacent flat or planar sections form a predetermined suitable angle with each other and the flat or planar section connected to each side portion forms a predetermined suitable angle with the corresponding side portion.

In the embodiments of the invention thus far described, two flux shields are employed having the relationship and the characteristics described in detail above. If desired, additional flux shields may be employed, as illustrated in the embodiments shown in FIGS. 9 and 10. Utilization of additional spaced parallel flux shields, as shown in FIGS. 9 and 10, provides still further attenuation of the flux and hence still further reduction in the heating of the wall portion 26. Further, because of the utilization of a greater number of flux shields, the thermal burden on any one flux shield is further reduced.

In the embodiment shown in FIG. 9, three spaced flux shields 76, 78 and 80 are employed. The flux shield 80 is positioned at the innermost point, that is, closest to the bushing indicated at 30. A plurality of openings, one of which is indicated at 82, provide for flow of cooling fluid, as indicated by the arrow 84, from the bushing area to the passage between flux shields 78 and 80.

At the top edge of the flux shield 78 a plurality of openings, one of which is shown at 86, are formed adjacent the cover member 88 to provide paths for flow of cooling fluid from the passage between shields 78 and 80 to the passage between shields 76 and 78, as indicated by the arrow 90. A plurality of openings, one of which is shown at 92, are provided at the bottom edge of the flux shield 76 to provide for flow of cooling fluid from the passage between flux shields 76 and 78 to the passage between flux shield 76 and wall portion 26 of the terminal box and exiting from conduit 24 ensuring a flow of cooling fluid over the surface of the wall portion 26 with high coolant velocity adjacent the end portions of pods 14, 16, 18, and exiting the terminal box through conduit 24. As in the embodiment of the invention previously described, cooling fluid flows, as indicated by the arrow 94, through the exit conduit providing high velocity to the coolant in the vicinity of wall 26 and eventually passing to the intake of the fan employed in the generator for circulation of cooling fluid.

In the embodiment of the invention shown in FIG. 9, two of the flux shields are formed of one type of material and the other flux shield is formed of another type of material. In any event, the flux shield 80, which is closest to the bushing area, is formed of a non-magnetic material of high electrical conductivity and the flux shield 76, which is closest to the wall portion 26, is formed of a magnetic material of relatively low electrical conductivity. The intermediate flux shield 78 may be formed of either a non-magnetic material of high electrical conductivity or a magnetic material of relatively low electrical conductivity.

It can be seen that the particular structure shown in FIG. 9 does not include one advantage of the form of the invention shown in FIGS. 1–4, namely, the limitation of any adverse effect on flow of cooling fluid resulting from any accumulation of oil in the bottom of the terminal box. This is so because the openings 82 in the inner flux shield 80 are formed adjacent the bottom of the terminal box and hence would be susceptible to blockage should any significant amount of oil accumulate. Openings 82 may, however, be elevated somewhat to avoid the expected oil accumulation, since full cooling flow is present over at least the outer surface of shield 78.

In the embodiment of the invention shown in FIG. 10 still additional flux shields have been included. In this embodiment of the invention, the innermost flux shield 96 corresponds generally to the inner flux shield 40 employed in the embodiment of the invention shown in FIGS. 2–4, that is, the flux shield 96 extends to the bottom of the terminal box and hence retains the advantage of blocking any oil collecting in the bottom of the terminal box from having any adverse effect on the flow of cooling fluid. The structure shown in FIG. 10 includes an outer flux shield 98 spaced from the wall portion 26 of the terminal box. Intermediate the flux shields 96 and 98 are arranged, in spaced relationship, three additional flux shields 100, 102 and 104. These additional flux shields, of course, provide additional attenuation of any flux transmitted from the bushing area and further reduce the thermal burden on any individual flux shield. The flux shields 98, 100, 102 and 104 are formed to have, at the bottom edges thereof, a plurality of openings, one of which, for each flux shield, is indicated by the numeral 106, for the flow of cooling fluid to the area between the flux shield 98 and the wall portion 26 of the terminal box. Thus, in the embodiment of the invention shown in FIG. 10, cooling fluid from the bushing area enters the passages between the flux shields 96, 100, 102, 104 and 98 at the top portion thereof as indicated by the arrows 108. It flows downwardly between these flux shields through the openings indicated at 106 and thence upwardly and laterally between the flux shield 98 and the wall portion 26 of the thermal box as with the embodiment of FIGS. 1-4, as indicated by the arrow 110, to provide for cooling along the surface of the wall portion 26. As with the previous embodiments the coolant exits the terminal box through conduit 24 to provide high velocity at the end regions of pods 14, 16, 18.

In the structure shown in FIG. 10, the innermost flux shield 96 is made of a non-magnetic material of high electrical conductivity as in the case of the flux shield 40 shown in the embodiment of the invention illustrated in FIGS. 2-4. Similarly, the outermost flux shield 98 is formed of a magnetic material of relatively low electrical conductivity, as in the case of the outer flux shield 38 in the embodiment of the invention shown in FIGS. 2-4. Flux shield 100 is formed of a non-magnetic material of high electrical conductivity corresponding to the material employed in forming the flux shield 96. Conversely, flux shield 104, which is adjacent the outer flux shield 98, is formed of a magnetic material of relatively low electrical conductivity corresponding to the material utilized to form the flux shield 98. The flux shield 102 may be formed of either a non-magnetic material of high electrical conductivity or a magnetic material of relatively low electrical conductivity. The shield or shields nearest the bushing area are in all cases made of a non-magnetic material of high electrical conductivity and the shield or shields nearest the wall portion of the terminal box are made of a magnetic material of low electrical conductivity.

It can be seen that by the embodiments of the invention described above an improved shielding of the wall portion of the terminal box and a corresponding reduction in the temperature of this wall portion are achieved. By employing multiple flux shields in spaced relationship, successive attenuation of the field is effected. Moreover, the attenuation is gradual, that is, step by step through the successive flux shields and therefore does not impose a heavy thermal burden on any one shield. Moreover increased shielding effectiveness is achieved by the employing of different materials for the different shields, these materials having particular magnetic and electrical conductivity characteristics as described above. Finally, in all embodiments described above, the provision for circulation of cooling fluid is such that the end portions of the pods of the terminal box which are susceptible to highest heating are swept by all the coolant fluid circulating within the inter-shield area and exits through conduits 24 at the end regions thereby assuring high fluid velocity and more effective cooling.

While specific embodiments of this invention have been shown and described, it will be understood that the invention is not limited to the particular structures so shown and described, and it is intended by the appended claims to cover all modifications which come within the spirit and scope of this invention. Thus, for example, the arrangement of planar sections to form the pod end portions of the flux shield is not limited to the embodiments shown. Any larger number of planar sections may be interposed, the greater the number, the closer the configuration approaches a curved section.

What is claimed is:

1. In a terminal box for a dynamoelectric machine having a high voltage bushing passing therethrough and having a wall subject to heating from stray leakage flux from said bushing, a flux shield structure comprising:
   (a) a first shield member spaced from said wall and providing a passage between said first shield member and said wall for flow of cooling fluid;
   (b) a second shield member interposed between said first shield member and said bushing, said second shield member being spaced from said first shield member to provide a passage for flow of cooling fluid therebetween; and
   (c) said first shield member being formed of a magnetic metallic material and said second shield member being formed of a non-magnetic metallic material.

2. The flux shield of claim 1, wherein said material of which said second shield member is formed is of high electrical conductivity and said material of said first shield member is formed is of low electrical conductivity.

3. The flux shield of claim 1, wherein openings for flow of cooling fluid to the passage between said first and second shield members are arranged so as to prevent the escape of stray flux therethrough to cause heating of said terminal box wall.

4. The flux shield of claim 3, wherein openings for flow of cooling fluid from the passage between said first and second shield members to the passage between said first shield member and said wall portion are provided at the lower edge of said first shield member and said second shield member is imperforate to the bottom of said terminal box.

5. A shielded and ventilated generator terminal box comprising a generally semicylindrical structure closed at each end and having a plurality of downwardly depending generally oval-shaped chambers in communication with said semicylindrical structure and opening thereinto, said chambers being terminated by a base plate having bushings therein for accommodating respective phase and neutral conductors and having a plurality of flux shields conforming generally to the interior wall configuration of said terminal box and spaced therefrom and from one another;
   said flux shields being selected of materials such that a first shield spaced adjacent said terminal box wall is made of a low conductivity, high permeability magnetic material and a second flux shield spaced inwardly of said first flux shield is made of a material that has high electrical conductivity and low magnetic permeability; and
   means for providing for a flow of coolant fluid between said respective flux shields and said outer flux shield and said terminal box wall.

6. The terminal box of claim 5 wherein coolant fluid flows from the generator to which said terminal box is attached, through the space between said first and said second flux shield, then through the space between said outer flux shield and said terminal box wall, then exits through the wall of said terminal box into a plurality of conduits and to a manifold from which it is returned to the generator cooling fan.

7. The terminal box of claim 6 wherein said conduits are located at the curved end regions of each of said oval-shaped chambers and are of a dimension to cause a high velocity of coolant fluid flow past the terminal box wall at said curved end regions to provide improved cooling thereto.

8. The terminal box of claim 5, wherein each shield member within said oval-shaped downwardly depending chambers includes planar side portions and curved end portions connecting said side portions.

9. The terminal box of claim 5, wherein each shield member includes planar side portions and planar end portions connecting said side portions and substantially perpendicular to said side portions in said oval-shaped chambers.

10. The terminal box of claim 5, wherein within each of said downwardly depending oval-shaped chambers each flux shield includes planar side portions and end portions connecting said side portions and wherein each end portion comprises a plurality of planar sections, adjacent planar sections being arranged at angles relative to each other, and the planar sections connected to each side portion being arranged at an angle relative to its corresponding side portions.

* * * * *